(12) United States Patent
Bradshaw et al.

(10) Patent No.: US 8,986,831 B2
(45) Date of Patent: Mar. 24, 2015

(54) PRESSURE SENSITIVE ADHESIVE TEAR TAPE

(75) Inventors: Dennis A. Bradshaw, Damascus, OR (US); Jorge A. Nash, Vancouver, WA (US); Bruce J. Shreeve, Portland, OR (US); Justine Hanlon, Vancouver (CA)

(73) Assignee: H. B. Fuller Company, St. Paul, MN (US)

( * ) Notice: Subject to any disclaimer, the term of this patent is extended or adjusted under 35 U.S.C. 154(b) by 505 days.

(21) Appl. No.: 13/114,993

(22) Filed: May 24, 2011

(65) Prior Publication Data

US 2012/0298734 A1 Nov. 29, 2012

(51) Int. Cl.
*B32B 7/12* (2006.01)
*B32B 15/04* (2006.01)
*C09J 7/04* (2006.01)
*C09J 11/08* (2006.01)

(52) U.S. Cl.
CPC ........ *C09J 7/04* (2013.01); *Y10T 428/15* (2015.01); *Y10T 428/2839* (2015.01); *Y10T 156/10* (2015.01); *Y10T 428/2848* (2015.01); *C09J 11/08* (2013.01); *C09J 2201/134* (2013.01); *C09J 2201/606* (2013.01); *C09J 2201/61* (2013.01); *C09J 2205/114* (2013.01); *C09J 2400/283* (2013.01); *C09J 2423/04* (2013.01); *C09J 2431/00* (2013.01)
USPC ...................................... 428/343; 428/355 R

(58) Field of Classification Search
USPC .............................. 428/343, 355 R
See application file for complete search history.

(56) References Cited

U.S. PATENT DOCUMENTS

| 4,344,556 | A | | 8/1982 | Knapp |
| 4,539,248 | A | * | 9/1985 | Brockington et al. ........ 428/161 |
| 4,609,578 | A | | 9/1986 | Reed |
| 4,737,403 | A | | 4/1988 | Simpson et al. |
| 4,773,541 | A | | 9/1988 | Riddell |
| 4,774,138 | A | | 9/1988 | Gardenier et al. |
| 4,778,059 | A | | 10/1988 | Martin et al. |
| 4,800,872 | A | | 1/1989 | Buese et al. |
| 4,819,807 | A | | 4/1989 | Giger |
| 4,898,159 | A | | 2/1990 | Buese et al. |
| 4,935,280 | A | | 6/1990 | Gangi |
| 4,946,732 | A | | 8/1990 | Cohen et al. |
| 5,098,757 | A | | 3/1992 | Steel |
| 5,135,790 | A | | 8/1992 | Kaplan et al. |
| 5,162,150 | A | | 11/1992 | Buis et al. |
| 5,190,798 | A | | 3/1993 | Bloch |
| 5,226,555 | A | | 7/1993 | Kovaleski |
| 5,254,387 | A | | 10/1993 | Gallucci |
| 5,342,291 | A | | 8/1994 | Scholz et al. |
| 5,356,706 | A | | 10/1994 | Shores |
| 5,376,419 | A | | 12/1994 | Foster et al. |

(Continued)

FOREIGN PATENT DOCUMENTS

DE 2856496 A * 7/1980
GB 822885 11/1959

(Continued)

*Primary Examiner* — Victor Chang
(74) *Attorney, Agent, or Firm* — Kirsten K. Stone; Wayne Rupert

(57) ABSTRACT

A tape that includes a cellulosic substrate defining a first surface and an opposing second surface; a pressure sensitive adhesive disposed on the first surface of the cellulosic substrate; and an encapsulated fibrous material disposed on the first surface of the cellulosic substrate or the second surface of the cellulosic substrate.

21 Claims, 9 Drawing Sheets

(56) References Cited

U.S. PATENT DOCUMENTS

| | | | |
|---|---|---|---|
| 5,464,151 A | 11/1995 | Parker et al. | |
| 5,543,171 A | 8/1996 | Shores | |
| 5,593,748 A | 1/1997 | Hubbard | |
| 5,631,079 A | 5/1997 | Gutman et al. | |
| 5,660,325 A | 8/1997 | Zacher | |
| 5,686,180 A | 11/1997 | Rivlin et al. | |
| 5,780,150 A | 7/1998 | Bloch et al. | |
| 5,795,834 A | 8/1998 | Deeb et al. | |
| 5,871,819 A | 2/1999 | Appelt et al. | |
| 5,893,514 A | 4/1999 | Fletcher et al. | |
| 5,895,539 A | 4/1999 | Hsu | |
| 5,919,525 A | 7/1999 | Appelt et al. | |
| 6,042,882 A | 3/2000 | Deeb et al. | |
| 6,048,806 A | 4/2000 | Deeb et al. | |
| 6,354,739 B1 | 3/2002 | Sheehan, Jr. et al. | |
| 6,613,859 B2 * | 9/2003 | Shores | 528/28 |
| 6,676,798 B1 | 1/2004 | Murray | |
| 6,713,174 B2 | 3/2004 | Mitchell | |
| 6,991,838 B2 | 1/2006 | Schwertfeger et al. | |
| 7,041,194 B1 | 5/2006 | Mueller et al. | |
| 7,056,844 B2 | 6/2006 | Sheely | |
| 7,250,216 B2 | 7/2007 | Taylor | |
| 7,601,411 B2 | 10/2009 | DuPont | |
| 7,731,082 B2 | 6/2010 | Jackson et al. | |
| 2003/0157850 A1 | 8/2003 | Taylor | |
| 2006/0019058 A1 | 1/2006 | Dickins | |
| 2007/0084559 A1 | 4/2007 | Graziano | |
| 2007/0155904 A1 | 7/2007 | Chou | |
| 2007/0257094 A1 | 11/2007 | Jackson et al. | |
| 2008/0081171 A1 | 4/2008 | DuPont | |
| 2009/0208741 A1* | 8/2009 | Toyama et al. | 428/355 AC |
| 2011/0293871 A1* | 12/2011 | Storfer-Isser | 428/41.8 |

FOREIGN PATENT DOCUMENTS

| | | | |
|---|---|---|---|
| GB | 838065 | 6/1960 | |
| WO | WO 01/70896 | 9/2001 | |
| WO | WO 2007/016382 | 2/2007 | |

* cited by examiner

VIEW A-A

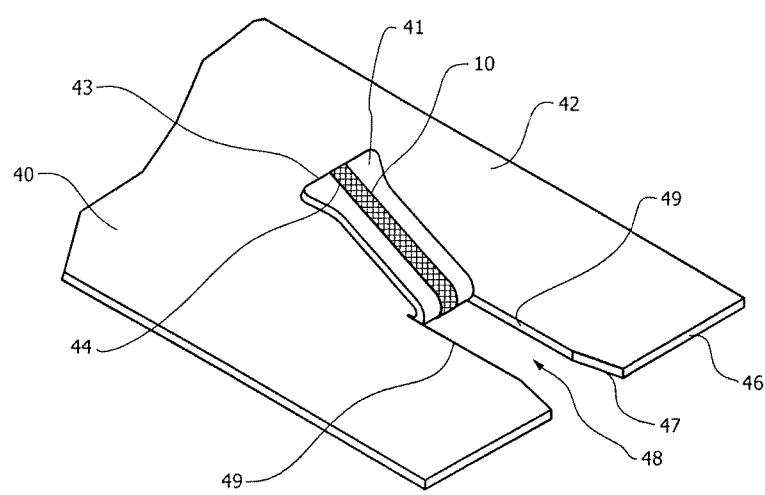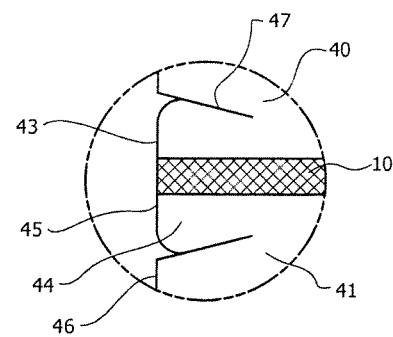
FIG. 3A
FIG. 3B

PRESSURE SENSITIVE ADHESIVE TEAR TAPE

BACKGROUND

Many consumer items today are packaged by manufacturers for purposes of transportation and shipment to retailers who thereafter remove the items from the container and place them on display in the retail outlet on counters or shelves for the convenience of the consumer. For the most part, such items are packaged in materials such as kraft paper or corrugated board depending on the strength required by the container. In many cases, and particularly with kraft paper packaging material, no opening feature is provided for the container so that, in order to remove the contents thereof, it is necessary to dismantle the container, which may result in its destruction. In some situations, such as containers formed with corrugated board packaging material, an opening feature in the form of score lines which define the desired opening are provided. However, such an opening feature is oftentimes inadequate since the tear resistance of such materials is high resulting in uneven tearing of the packaging material and destruction of the container itself. It is also possible to utilize a sharp object, such as a knife, for the purpose of cutting the packaging material along desired lines. This means, however, is dangerous and can result in injury or damage to the contents of the container and consequent wastage.

As indicated above, containers formed of kraft paper, paperboard or corrugated board containing consumer items are opened and the items removed and positioned on shelves or counters at the retail outlet. In certain embodiments the containers are themselves display-ready after they are opened. Opening of the container and the removal (from non display-ready containers) and display of the consumer items is a labor intensive operation which requires a person to physically perform the necessary operations. A great benefit could, therefore, be derived if the container itself could be utilized at the retail outlet as the display device for the consumer units thereby eliminating much of the labor presently necessary for removing the units from the container for display. However, this is not possible where the container itself is destroyed during the opening process or else, in those situations where an opening feature was provided, this proved to be inadequate.

Pressure sensitive adhesive (PSA) tapes made with thin plastic film substrates are currently available for tear opening of containers, but such tapes do not demonstrate sufficient tensile strength to pull cleanly through paper board substrates, particularly corrugated board substrates. In addition, the PSA plastic film tapes suffer from poor nick resistance and inadequate bond strength to paper board substrates. Further, it is not possible to cut plastic film tapes in line to form a tear tab.

SUMMARY

Disclosed herein is a tape comprising:
a cellulosic substrate defining a first surface and an opposing second surface;
a pressure sensitive adhesive disposed on the first surface of the cellulosic substrate; and
an encapsulated fibrous material disposed on the first surface of the cellulosic substrate or the second surface of the cellulosic substrate.

Also disclosed herein is a tear opening system for a paper board construct, comprising:

(a) a paper board substrate defining a first surface and a second surface;
(b) at least one tear tape disposed on at least one of the first surface or the second surface of the paper board substrate, wherein the tear tape includes:
   a cellulosic substrate defining a first surface and an opposing second surface;
   a pressure sensitive adhesive disposed on the first surface of the cellulosic substrate; and
   a fibrous material disposed on the first surface of the cellulosic substrate or the second surface of the cellulosic substrate,
wherein the pressure sensitive adhesive of the tear tape adheres to the first surface or the second surface of the paper board substrate; and
(c) a tear-initiating element associated with the tear tape and the paper board substrate.

In addition, disclosed herein is a container comprising:
a plurality of side wall panels comprising a corrugated board substrate, wherein the side wall panels each define an exterior surface and an interior surface; and
a tear opening system, wherein the tear opening system comprises:
   (i) a tear tape adhesively secured to the interior surface of at least one of the side wall panels, wherein the tear tape includes:
      a cellulosic substrate defining a first surface and an opposing second surface;
      a pressure sensitive adhesive disposed on the first surface of the cellulosic substrate and adhesively securing the tear tape to the interior surface of the container; and
      an encapsulated fibrous material disposed on the first surface of the cellulosic substrate or the second surface of the cellulosic substrate; and
   (ii) a tear-initiating element located on the tear tape.

Further disclosed herein is a composition comprising:
a base polymer comprising an ethylene vinyl acetate polymer; and
a surface-migratory release agent with a melt point of at least 120° C.

Also disclosed herein is a method for making a tape comprising:
applying a hot melt adhesive to a fibrous substrate;
joining the hot melt adhesive-applied fibrous substrate with a first surface of a cellulosic substrate at a condition in which the hot melt adhesive is in a molten state prior to contacting the hot melt adhesive-applied fibrous substrate with the cellulosic substrate; and
applying a pressure sensitive adhesive to a second surface of the cellulosic substrate, wherein the first surface of the cellulosic substrate opposes the second surface of the cellulosic substrate.

Another method disclosed herein is a method for making a tear opening system for a paper board construct having a first surface and an opposing second surface, comprising:
applying at least one tear tape to at least the first surface of the paper board construct or the second surface of the paper board construct at a dry end section of a paper board construct manufacturing process, wherein the tear tape includes:
   a cellulosic substrate defining a first surface and an opposing second surface;
   a pressure sensitive adhesive disposed on the first surface of the cellulosic substrate; and a fibrous material disposed on the first surface of the cellulosic substrate or the second surface of the cellulosic substrate, and wherein the tear tape is applied such that the pressure sensitive adhesive of the tear tape adheres to the first surface or the second surface of the paper board substrate.

The foregoing will become more apparent from the following detailed description, which proceeds with reference to the accompanying figures.

BRIEF DESCRIPTION OF THE DRAWINGS

FIG. 3A is a perspective view of one embodiment of a paper board substrate that is partially torn via a tear tape opening system as disclosed herein.

FIG. 3B is an exploded view of a portion of the paper board substrate shown in FIG. 3A.

DETAILED DESCRIPTION OF ILLUSTRATIVE EMBODIMENTS

PSA Tape

Figure 1A:
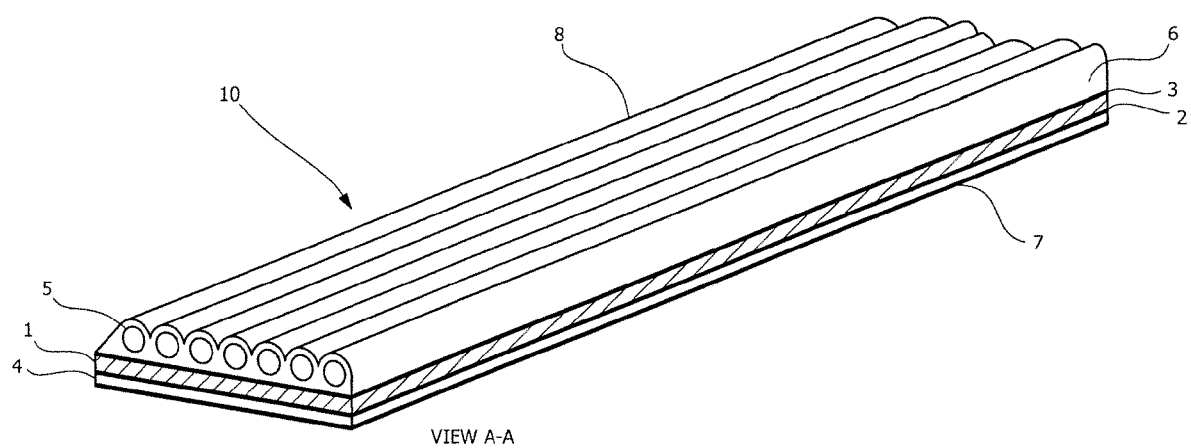
FIG. 1A is a perspective view of a cross-section of one embodiment of a PSA tape disclosed herein. The view of FIG. 1A is from line A-A as shown in FIGS. 1B and 1C.

Disclosed herein are tapes that include at least a cellulosic substrate, a PSA and a fibrous material. In certain embodiments, the fibrous material is encapsulated with a thermoplastic composition (which in certain embodiments may be a hot melt adhesive and in other embodiments may be a PSA) that bonds the fibrous material to the cellulosic substrate. The tape also includes a PSA surface that creates a bond with a paper board substrate. In addition, the tape includes a release agent that prevents the PSA surface of the tape from adhering to the opposing surface of the tape when the tape is wound upon itself. The cellulosic substrate is a carrier to unitize all of the other components of the tape into a linear tape. The cellulosic substrate also imparts sufficient weft strength to the tape. The tape may have a high weft strength, but it has a propensity to tear only in the tape lengthwise direction.

Certain features of illustrative embodiments of the PSA tapes disclosed herein are a higher tensile strength and weft strength that enable a cleaner tear line, a higher bond strength to the paper board substrate, and ability to apply the PSA tape at the dry end of a corrugators, in a folder gluer apparatus, or a folding carton press.

Generally, the PSA portion of the tear tape is configured to facilitate secure attachment of the tape to a paper board substrate. The PSA can be a solvent-based adhesive, a water-based adhesive or a hot melt adhesive. Examples of suitable PSA base polymers include rubber pressure-sensitive adhesives containing any of the natural rubbers and synthetic rubbers as a base polymer; acrylic pressure-sensitive adhesives containing, as a base polymer, an acrylic polymer (homopolymer or copolymer) composed of one or more monomer components selected from alkyl esters of (meth)acrylic acids (e.g., alkyl esters whose alkyl moiety having 1 to 20 carbon atoms, such as methyl ester, ethyl ester, propyl ester, isopropyl ester, butyl ester, isobutyl ester, s-butyl ester, t-butyl ester, pentyl ester, hexyl ester, heptyl ester, octyl ester, 2-hydroxyethyl ester, 2-ethylhexyl ester, isooctyl ester, isodecyl ester, dodecyl ester, tridecyl ester, pentadecyl ester, hexadecyl ester, heptadecyl ester, octadecyl ester, nonadecyl ester, and eicosyl ester); vinyl alkyl ether pressure-sensitive adhesives; silicone pressure-sensitive adhesives; polyester pressure-sensitive adhesives; polyamide pressure-sensitive adhesives; urethane pressure-sensitive adhesives; styrenic block copolymer pressure-sensitive adhesives; and pressure-sensitive adhesives having improved creep properties and corresponding to these pressure-sensitive adhesives, except for further containing a tackifying resin having a melting point of about 200° C. or below.

In certain embodiments, the pressure sensitive adhesive is a hot melt pressure sensitive adhesive that includes a styrenic block copolymer as the base polymer. Suitable styrenic block copolymers include those having end-blocks of styrene and a rubbery mid-block of butadiene, isoprene, ethylene/propylene, ethylene/butylene and combinations thereof. Styrenic block copolymers are available in a variety of structures including, e.g., A-B-A triblock structures, A-B diblock structures, $(A-B)_n$ radial block copolymer structures, and branched and functional versions thereof, wherein the A end-block is a non-elastomeric polymer block that includes, e.g., polystyrene, vinyl or a combination thereof, and the B block is an unsaturated conjugated diene or hydrogenated version thereof. Examples of suitable B blocks include isoprene, butadiene, ethylene/butylene (hydrogenated butadiene), ethylene/propylene (hydrogenated isoprene) and combinations thereof.

In certain embodiments, the pressure sensitive adhesive is a hot melt pressure sensitive adhesive that includes a styrene-isoprene-styrene block copolymer. Useful commercially available styrene-isoprene-styrene block copolymers include KRATON D1111 and KRATON D1119 available from Kraton Polymers U.S. LLC (Houston, Tex.).

The pressure-sensitive adhesive may further contain other components in addition to the base polymer. Examples of such other components include crosslinking agents such as polyisocyanates and alkyl-etherified melamine compounds; tackifiers such as rosin derivative resins (e.g. wood rosin, tall oil, gum rosin, and rosins esters), natural and synthetic polyterpene resins and derivatives thereof, petroleum resins (e.g. aliphatic, aromatic and mixed aliphatic aromatic), hydrocarbon resins (e.g. alph methyl styrene resins, branched and unbranched C5 resins, C9 resins, C10 resins as well as styrenic and hydrogenated modifications of such, and oil-soluble phenol resins; plasticizers (e.g. liquid or solid plasticizers including e.g. hydrocarbon oils, polybutene, liquid tackifying resins, liquid elastomers and benzoate plasticizers); fillers; age inhibitors; and other suitable additives. Independently, the pressure-sensitive adhesive may further contain glass beads or resin beads. The addition of such glass or resin beads may facilitate the control of pressure-sensitive adhesive properties and shear moduli.

The cellulosic substrate may be a paper substrate. For example, any of the types of papers that can assist in providing the desired tape weft strength can be employed. In certain embodiments the cellulosic substrate also provides a barrier to prevent undesirable wicking of the PSA composition and/or the hot melt adhesive composition from one side of the cellulosic substrate to the opposing side of the cellulosic substrate. Examples of the types of paper which can be used include paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having basis weights ranging from 97 g/m$^2$ to 440 g/m$^2$ is preferred.

As described herein, a hot melt adhesive may be utilized to encapsulate and bond the fibrous material to the cellulosic substrate. The hot melt adhesive should not be heat-activated under dry end corrugator conditions (described below in more detail). Re-activation of the hot melt adhesive during the paper board/container manufacturing process would be undesirable since a purpose of the hot melt adhesive is to maintain the bond between the fibers and the cellulosic substrate.

Hot melt adhesive compositions useful in the presently disclosed tape typically are thermoplastics based on polymer compositions that liquefy between temperatures of 80° C. to 220° C. and solidify again when cooled. In certain embodiments, the hot melt adhesive composition has a melt point of at least 90° C. to avoid re-activation during the paper board/container manufacturing process. Hot melt adhesives are desirable for their quick setting and/or the absence of aqueous or solvent media that provide fluidity to other types of adhesives. They include a dry polymer (less than 5% liquid) and are applied in a molten state without using water or solvents. In general, the hot melt adhesive composition disclosed herein may include a base polymer selected from a low molecular weight polyethylene homopolymer (LMPE), ethylene vinyl acetate copolymer (EVA), a polyamide and a moisture cross-linkable polyurethanes or combinations thereof.

The EVA copolymer includes copolymers derived from the copolymerization of ethylene and vinyl acetate. The relative amount of the vinyl acetate comonomer incorporated into ethylene/vinyl acetate copolymers can, in principle, vary broadly from a few weight percent up to as high as 45 weight percent of the total copolymer or even higher. The relative amount of the vinyl acetate present can be viewed as establishing how and to what degree the resulting ethylene copolymer is to be viewed as a polar polymeric constituent in the blended composition. The ethylene/vinyl acetate copolymer can have varied amounts of vinyl acetate content, but preferably has a vinyl acetate unit content of from 6 to 40% by weight, especially from 12 to 32% by weight. The ethylene/vinyl acetate copolymer may optionally be modified by methods well known in the art (for example, grafting), including modification with an unsaturated carboxylic acid or its derivatives. Suitable ethylene/vinyl acetate copolymers include those available from E.I. du Pont de Nemours and Company (DuPont), Wilmington, Del. under the ELVAX tradename. Other ethylene/vinyl acetate copolymers are available from Exxon Chemical Co. under the tradename ESCORENE and also from Millennium Petrochemicals, Rolling Meadows, Ill., under the tradename ULTRATHENE and AT copolymers available from AT Polymers & Film Co., Charlotte, N.C. and EVATANE from Atofina Chemicals, Philadelphia, Pa. A mixture of two or more different ethylene/vinyl acetate copolymers can be used in the hot melt adhesive compositions in place of a single copolymer as long as the average values for the comonomer content will be within the range indicated above.

Waxes optionally can be used to modify the properties of a hot melt composition. Wax can reduce the overall viscosity of the adhesive, thereby allowing it to liquefy easily. The wax may also control the open time, set speed and thermal stability of the system. The wax, when present, is preferably included in a finite amount of at least about 0.1 weight %, at least about 2 weight %, or at least about 5 weight % of the total weight of the adhesive composition. Also preferably, the wax is present in a finite amount of up to about 10 weight %, 20 weight %, 25 weight %, 30 weight %, 35 weight %, 40 weight %, or 50 weight %, based on the total weight of the adhesive composition.

Suitable waxes include paraffin waxes, microcrystalline waxes, high-density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. The term "synthetic high melting point waxes" includes high-density low molecular weight polyethylene waxes, by-product polyethylene waxes and Fischer-Tropsch waxes. Modified waxes, such as vinyl acetate-modified and maleic anhydride-modified waxes may also be used.

Notable paraffin waxes have a ring and ball softening point of about 55° C. to about 85° C. Paraffin waxes include OKERIN 236 TP available from Astor Wax Corporation, Doraville, Ga.; PENRECO 4913 available from Pennzoil Products Co., Houston, Tex.; R-7152 Paraffin Wax available from Moore & Munger, Shelton, Conn.; and Paraffin Wax 1297 available from International Waxes, Ltd in Ontario, Canada. Other notable paraffin waxes have melting points in the range of about 55 to 75° C., such as, for example, PACEMAKER available from Citgo, and R-2540 available from Moore and Munger; and low melting synthetic Fischer-Tropsch waxes having a melting point of less than about 80° C. Particularly notable is paraffin wax with a melting point of about 65° C. Other paraffinic waxes include waxes available from CP Hall (Stow, Ohio) under the product designations 1230, 1236, 1240, 1245, 1246, 1255, 1260 and 1262.

Wax may be present in up to 50 weight % of the hot melt composition; for example, from 10 to 50 weight % when a tackifier is not present. When used in combination with at least one tackifier, preferably from about 5 to about 45 weight % wax is present. Preferred waxes have a melting point of from about 60° C. to about 68° C. and have oil content of less than about 0.5, preferably less than about 0.2 weight %.

Optionally, tackifiers may be used in the hot melt adhesive compositions primarily to enhance initial adhesion to differentiated substrates. Tack is useful in a hot melt adhesive composition to allow for proper joining of articles before the heated adhesive hardens. Tackifiers are added to give tack to the adhesive and also to lower viscosity. The tackifier allows the composition to be more adhesive by improving wetting during the application. The presence of tackifiers lowers the resistance to deformation and hence facilitates bond formation on contact.

The tackifier, when present, is preferably included in a finite amount of at least about 0.1 weight %, at least about 2 weight %, or at least about 5 weight % of the total weight of the adhesive composition. Also preferably, the tackifier is present in a finite amount of up to about 10 weight %, 20 weight %, 25 weight %, 30 weight %, 35 weight %, 40 weight %, or 50 weight %, based on the total weight of the adhesive composition.

The tackifier may be any suitable tackifier known generally in the art such as those listed in U.S. Pat. No. 3,484,405. Such tackifiers include a variety of natural and synthetic resins and rosin materials. The resins that can be employed are liquid, semi-solid to solid, complex amorphous materials generally in the form of mixtures of organic compounds having no definite melting point and no tendency to crystallize. Such resins are insoluble in water and can be of vegetable or animal origin, or can be synthetic resins. The resins can provide substantial and improved tackiness to the composition. Suitable tackifiers include but are not necessarily limited to the resins discussed below.

A class of resin components that can be employed as the tackifier composition is the coumarone-indene resins, such as the para-coumarone-indene resins. Generally the coumarone-indene resins that can be employed have a molecular weight that ranges from about 500 to about 5,000. Examples of resins of this type that are available commercially include those materials marketed as PICCO-25 and PICCO-100.

Another class of tackifier resins is terpene resins, including also styrenated terpenes. These terpene resins can have a molecular weight range from about 600 to 6,000. Typical commercially available resins of this type are marketed as PICCOLYTE S-100, as STAYBELITE Ester #10, which is a glycerol ester of hydrogenated rosin, and as WINGTACK 95, which is a polyterpene resin.

A third class of resins that can be employed as the tackifier are the so-called hydrocarbon resins produced by catalytic polymerization of selected fractions obtained in the refining of petroleum, and having a molecular weight range of about 500 to about 5,000. Examples of such resin are those marketed as PICCOPALE-100, and as AMOCO and VELSICOL resins.

The tackifier may also include rosin materials, low molecular weight styrene hard resins such as the material marketed as PICCOLASTIC A-75, disproportionated pentaerythritol esters, and copolymers of aromatic and aliphatic monomer systems of the type marketed as VELSICOL WX-1232.

Rosins useful as tackifiers may be any standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used. Rosin is the residue left after distilling off the volatile oil from the oleoresin obtained from *Pinus palustris* and other species of *Pinus*, Pinaceae. It is available as wood rosin (from Southern pine stumps after harvesting the stumps, chipping the stumps into small chips, extracting the chips with hexane or higher-boiling paraffin, and distilling the hexane or paraffin to yield wood rosin) gum rosin (the exudates from incisions in the living tree, *P. palustris* and *P. caribaea*) and tall oil rosin. Rosin contains about 90% resin acids and about 10% neutral matter. The acids present in natural rosin may be purified by, for example, by saponification, extraction of the neutral matter and reacidifying. Of the resin acids about 90% are isomeric with abietic acid ($C_{20}H_{30}O_2$); the other 10% is a mixture of dihydroabietic acid ($C_{20}H_{32}O_2$) and dehydroabietic acid ($C_{20}H_{28}O_2$). (See The Merck Index, Tenth Ed. Rahway, N.J., USA, 1983, page 1191, entry 8134). Tall oil, also known as liquid rosin, is a byproduct of the wood pulp industry and is usually recovered from pinewood "black liquor" of the sulfate or Kraft paper process. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Tall oil typically contains rosin acids (34 to 40%), fatty acids such as oleic and linoleic acids (50-60%) and neutral matter (5 to 10%). (See The Merck Index, Tenth Ed., page 1299, entry 8917). Preferably, the rosin contains at least 90 weight % resin acids, and less than 10 weight % fatty acids. Some rosin dimerization product, which may form during the fractionation process, may also be present in the tall oil rosin. Rosin is available commercially in several grades (for example, under the tradename RESINALL from Resinall Corporation, and other products supplied by Hercules, Aarakawa, etc.). A standard grade of rosin is available commercially from Union Camp Corporation (Wayne, N.J.) under the UNITOL tradename. Commercially available rosins that can be used to practice the invention also include SYLVARES RE 115, available from Arizona Chemical and SYLVARES RE 104, available from Arizona Chemical.

As used herein, the term "rosin" collectively includes natural rosins, liquid rosins, modified rosins and the purified rosin acids, and derivatives of rosin acids, including partially to completely neutralized salts with metal ions, e.g. resinate, etc. The rosin may be gum, wood or tall oil rosin but preferably is tall oil rosin.

The rosin material may be modified rosin such as dimerized rosin, hydrogenated rosin, disproportionated rosin, or esters of rosin. Essentially any reaction conditions recognized in the art for preparing modified rosin resins (including derivatives thereof) may be employed to prepare a modified rosin. Rosins can be modified by, for example, esterification of some or all of the carboxylic moieties or by forming carboxylate salts by saponification. Esters can be prepared by esterifying the rosin with polyhydric alcohols containing from 2 to 6 alcohol groups.

Phenolic-modified rosin esters are typically prepared by the reaction of rosin and a phenolic compound. This phenolic resin is then esterified with a polyhydric alcohol providing phenolic-modified rosin esters. Typically, the combinations of reactants are exposed to an elevated temperature in the range of 100 to 300° C. At these elevated temperatures, the reactants undergo covalent bond-forming reactions with other reactants, so that a resinous material is formed. Reaction products of rosins and their methods of preparation are well known in the art (See for example U.S. Pat. No. 2,007,983).

Aromatic tackifiers include thermoplastic hydrocarbon resins derived from styrene, alpha-methylstyrene, and/or vinyltoluene, and polymers, copolymers and terpolymers thereof, terpenes, terpene phenolics, modified terpenes, and combinations thereof. KRISTALEX 3100 is a low molecular weight thermoplastic hydrocarbon polymer derived largely from alphamethylstryene with a Ring and Ball softening point of 97 to 103° C., commercially available from Eastman Chemical Company (Kingsport, Tenn.).

A more comprehensive listing of tackifiers, which can be employed, is provided in the TAPPI CA Report #55, February 1975, pages 13-20, inclusive, a publication of the Technical Association of the Pulp and Paper Industry, Atlanta, Ga., which lists well over 200 tackifier resins that are commercially available.

Preferred tackifiers will generally have average softening points ranging from about 85° C. to about 130° C., more typically from about 100° C. to about 125° C., will have a weight average molecular weight greater than about 1000, will have an acid number of less than about 20 and will have a viscosity at 125° C. of greater than about 10,000 cp.

One can determine the molecular weight and softening point of a tackifier by dissolving the material in a suitable solvent such as tetrahydrofuran, and analyzing a sample of that solution using gel permeation chromatography. The molecular weight average in grams/mole, Mw, is determined by comparison to the retention time and elution profile of polystyrene standards of known molecular weight (commercially available from many Chromatography supply houses, e.g., Supelco, Inc. or Waters Associates). The softening point may be measured using a Mettler FP90 Central Processor and a Mettler FP83 HT Dropping Point cell with a softening point ring.

Tackifiers may be present in up to 50 weight % of the hot melt composition; for example, from 10 to 50 weight % when wax is not present. When used in combination with wax, about 5 to about 45 weight % of tackifier may be present. Mixtures of two or more of the tackifying resins may be required for some formulations.

The hot melt adhesive composition can optionally include a plasticizer. Possible plasticizers include oil, butadiene-styrene resins having a molecular weight ranging from about 500 to about 5,000. A typical commercial product of this type is marketed as BUTON 100, a liquid butadiene-styrene copolymer resin having a molecular weight of about 2,500; polybutadiene resins having a molecular weight ranging from about 500 to about 5,000. A commercially available product of this type is that marketed as BUTON 150, a liquid polybutadiene resin having a molecular weight of about 2,000 to about 2,500. Similarly, polybutenes obtained from the polymerization of isobutylene may be included.

In the embodiments disclosed herein in which a release agent is included in a hot melt adhesive composition, the release agent may be an internal release agent that "blooms" to the surface of the tape ducting manufacture of the tape. In other words, the release agent is a surface-migratory release agent. In other embodiments disclosed herein the release agent may be an external release agent that is coated on a surface, for example, an external release agent coated on a surface of the cellulosic substrate. In still other embodiments, the release agent is in the form of a release paper that is adhered to the hot melt adhesive composition.

The release agent may have a high melting point (e.g., at least about 120° C.) so that the release agent does not melt during the paper board substrate/tape manufacturing process. Illustrative release agents include ethyl acrylate-acrylonitrile copolymer, an acrylic acid-alkyl acrylate copolymer (e.g., acrylic acid-ethyl acrylate copolymer), a polyvinyl chloride resin, a polyvinyl N-octadecyl carbamate, a polyethylene based wax, a polyamide based wax, a polysiloxane, a fluorocarbon polymer, a-polyvinyl ester (e.g., vinyl stearate, vinyl palmitate, etc.), a polyethylene imine, an alkyl substituted amine, a fatty acid material (such as a fatty acid-based wax (e.g., a fatty acid condensate)), a chromium complex (e.g., stearate chromic chloride), and mixtures thereof. Illustrative fatty acid release agents include saturated or unsaturated compounds having 4 to 26 carbon atoms. The fatty acid release agent may be in the form of a fatty acid, a fatty acid ester, fatty acid amides (e.g., oleamide, stearamide, erucamide, behenamide, N-oleylpalmitide, N-stearyl erucamide) or a fatty acid condensate. Examples of such release coating compositions include those commercially available under the trade designations MICROMID 321RC (a polyamide dispersion) from Union Camp Corp., Jacksonville, Fla., FC270 (a fluorochemical) from Minnesota Mining & Manufacturing Co., St. Paul, Minn., NORPEL 7645 (a fatty acid condensate), and NORPEL 32776 (an ethylene bisstearamide) from Northern Products, Inc. Woonsocket, R.I, and ACRAWAX (an ethylene bisstearamide) from Lonza Inc. In certain embodiments, the release agent is present in the hot melt adhesive composition in an amount of 5 to 30, particularly 7 to 20.5, and more particularly 10 to 20 weight percent, based on the total weight of the hot melt adhesive composition. The amount of the release agent, and type of release agent, should be tailored so that the tape can release from the PSA surface as the tape is unwound from the tape roll, while the hot melt adhesive composition retains sufficient bonding strength to maintain the fibrous material on the cellulosic substrate.

In other embodiments, the hot melt adhesive contains no release agent but is rather formulated to have release properties such as e.g. including a high content of wax.

In certain embodiments the hot melt adhesive composition may include 10 to 60, more particularly 30 to 50, weight percent of EVA as a base polymer; 10 to 40, more particularly, 15 to 35, weight percent at least one tackifier; 5 to 30, more particularly 10 to 25, weight percent, of a wax; and 5 to 30, more particularly 7 to 20.5, weight percent of a release agent, based on the total weight of the hot melt adhesive composition.

The fibrous material may be in the form of a woven or nonwoven web, a fiber-reinforced film, a multifilament yarn, a monofilament, or any combination thereof. The fibers of the fibrous material may be continuous strands (e.g., a multifilament yarn or a monofilament) unidirectionally oriented in a direction parallel to the length of the tape. Examples of fibrous materials include polyester fiber, polyester film, polyamide fiber (e.g., aromatic polyamide such as KEVLAR fiber from E.I. du Pont or non-aromatic polyamide such as nylon), polypropylene fiber, polyethylene fiber, fiberglass, natural fibers such as cotton or hemp, and/or other similar materials. In certain embodiments the fibrous material is polyester fiber. In certain embodiments, the fibrous material is present in the fibrous material-containing composition in an amount of 10 to 25, particularly 13 to 22, and more particularly 16 to 29 weight percent, based on the total weight of the fibrous material-containing composition. In certain embodiments, the fibrous material has a denier of 300 to 600 per mm of tape width.

In certain embodiments, the PSA tape has a tensile strength of at least 9 kg, more particularly at least 11 kg, and most particularly at least 14 kg, per 6 mm width of tape or 2.3 kg/mm of tape width. In certain embodiments the PSA tape has a weft strength of at least 0.5, more particularly at least 1.4 kg. In certain embodiments the PSA tape applied to a paper board substrate may have a peel strength sufficient to result in paper tear of the paper board substrate (e.g., a minimum peel strength of at least 2.5 lb/in). The PSA tape also is nick or puncture resistant because the tens, hundreds, or thousands of individual fiber strands prevent propagation of an initial nick or puncture. In certain embodiments, the PSA tape may have a total basis strand weight of 3.40 to 4.95, more particularly 3.50 to 4.80, and most particularly 3.60 to 4.70, g/linear m based on a 12 mm tape width. In certain embodiments, the PSA tape may have a thickness of 0.228 to 0.382 mm, more particularly 0.254 to 0.342 mm, prior to adhesion to the paper board. In some embodiments, the PSA tape can have a length longer than its width. In other words, the PSA tape defines a longitudinal axis along a longitudinal direction. In specific embodiments, the width of the PSA tape is 2 mm to 52 mm, more particularly 3 mm to 25 mm, and most particularly 4 to 12 mm.

The tape may be made by applying the adhesive (either the PSA alone or the PSA and the hot melt adhesive) in a molten hot state to the fibrous material substrate and the cellulosic substrate while each substrate is under tension at a controlled speed. Once the molten hot adhesive(s) are applied to the substrates, all of the tape components are brought together into intimate contact with each other while the adhesive(s) is in a liquid hot molten state. The molten adhesive(s) are allowed to cool and set up as a solid forming a linear unitized tape. The tape production process may include any heating methods known for applying hot melt adhesives.

Substrate with PSA Tape

The PSA tape may be applied to any type of paper board substrate. In certain embodiment, the substrate may be a corrugated paper board. The corrugated board substrate includes an exterior liner and a corrugated member. In some implementations, the corrugated member consists of a series of parallel flutes. However, in other implementations, the corrugated member can include other configurations, such as a waffle-type pattern or honeycomb. The corrugated paper board may be a single wall structure (i.e., includes a single fluted corrugated medium and at least one liner layer) or a multiwall structure (i.e., includes at least two fluted corrugated mediums and at least one liner layer). One or more substrates can form an article of manufacture such as a packaging container. Examples of packaging containers include cartons and boxes, such as cartons for holding beverages for sale at the retail level (for instance, a hand-carry carton that holds six, 12 or 24 bottles or cans of a beverage), meat and produce bulk bins, wet-packed containers, reusable containers, rubber and chemical bulk bins, heavy duty containers, bags, and envelopes. A continuous corrugated board substrate can be manufactured by bonding the corrugated member to the exterior liner using an adhesive, and subjecting the exterior liner and corrugated member to heat.

The PSA tape may be used as a tear tape for opening an article, such as a container, made from a paper board substrate. The PSA tape may be used in one-tape opening systems or multi-tape opening systems (e.g., a two-tape opening system). Tape opening systems can also provide reinforcement of a container substrate while facilitating effective opening of the container. Multi-tape opening systems typically include at least two tapes—a tear tape and a guide tape. The presently disclosed PSA tape may be utilized as the tear tape with another type of a tape as the guide tape, or both the tear tape and the guide tape may be the PSA tapes.

EXAMPLES

One embodiment of a PSA tape 10 disclosed herein is shown in FIG. 1A. The PSA tape 10 includes a cellulosic substrate 1 that defines a first surface 2 and an opposing second surface 3. A pressure sensitive adhesive 4 is disposed on the first surface 2 of the cellulosic substrate 1. The pressure sensitive adhesive 4 may be a layer that covers all, or only a portion thereof, of the area of the first surface 2. Fibers 5 are disposed on, or near, the second surface 3 of the cellulosic substrate 1. The fibers 5 may, or may not, contact the second surface 3. The fibers 5 may be encapsulated by a composition 6. As used herein, "encapsulation" is inclusive of coating the entire circumferential and longitudinal surface of the fibers 6, or only a portion of the circumferential and longitudinal surface of the fibers 6. For example, the composition 6 may completely coat the entire circumferential surface of the fibers 6 so that the composition 6 is present in an area between the fibers 5 and the second surface 3 of the cellulosic substrate 1. Alternatively, the composition 6 only coats a portion of the circumferential surface of the fibers 5. In one embodiment, the fibers 5 contact the second surface 3 of the cellulosic substrate 1 and the composition 6 only coats the portion of the fiber surface not in contact with the second surface 3. The composition 6 also may or may not impregnate the fibers 5. The composition 6 may include a release agent as described above. Thus, the tape 10 defines a first surface 7 and an opposing second surface 8. The fiber-encapsulating composition 6 forms one outer layer of the tape 10, and the pressure sensitive adhesive 4 forms the other outer layer of the tape 10.

Figure 2:
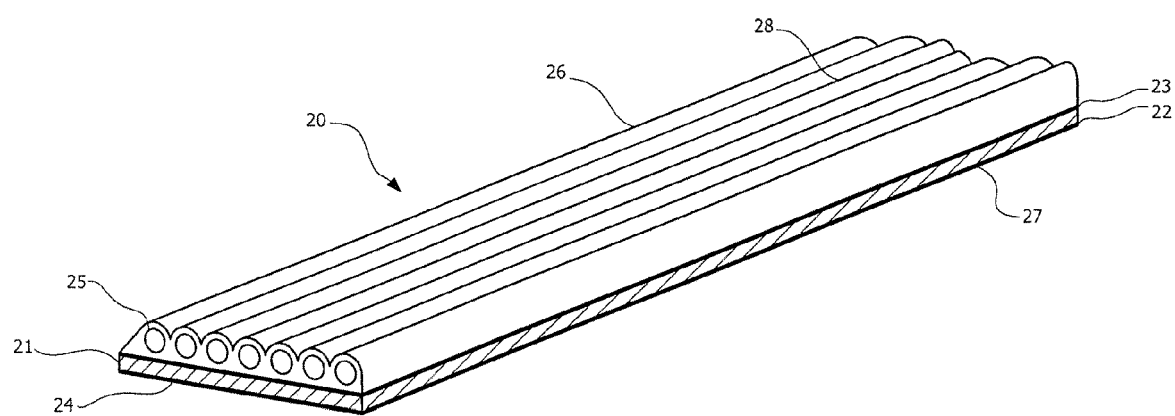
FIG. 2 is a perspective view of a cross-section of one embodiment of a PSA tape disclosed herein. The view of FIG. 2 is from line A-A as shown in FIGS. 1B and 1C.

Another embodiment of a PSA tape 10 disclosed herein is shown in FIG. 2. The PSA tape 20 includes a cellulosic substrate 21 that defines a first surface 22 and an opposing second surface 23. A release coating 24 is disposed on the first surface 22 of the cellulosic substrate 21. The release coating 24 includes a release agent, which may be a release agent as described above or another type of release agent. Fibers 25 are disposed on the second surface 23 of the cellulosic substrate 21. The fibers 25 may, or may not, contact the second surface 23. The fibers 25 are encapsulated by a pressure sensitive adhesive composition 26. Thus, the tape 20 defines a first surface 27 and an opposing second surface 28. The pressure sensitive adhesive composition 26 forms one outer layer of the tape 20, and the release agent coated cellulosic substrate 21 first surface 22 forms the other outer layer of the tape 20.

Figure 1B:
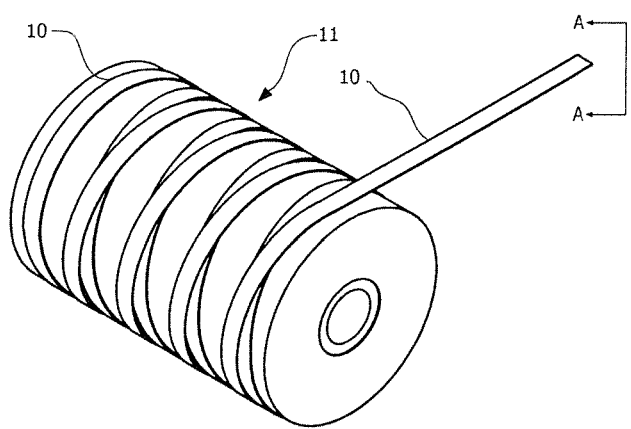
FIG. 1B is a perspective view of one embodiment of a tape roll as disclosed herein.
Figure 1C:
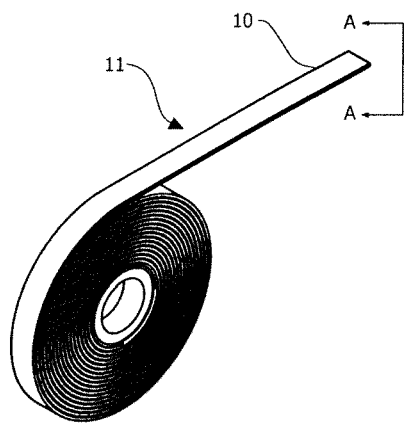
FIG. 1C is a perspective view of another embodiment of a tape roll as disclosed herein.

The tape 10 (or tape 20) may be provided in the form of a roll 11 as shown, for example, in FIGS. 1B and 1C. In the embodiment shown in FIG. 1B the tape 10 is wound upon itself in an arrangement in which an outer length of tape 10 is aligned at an angle, particularly an acute angle, relative to an inner length of tape 10 upon which the outer length is disposed. In other words, each successive wind of the tape 10 traverses the previous, or underlying, tape 10 wind at an angle, particularly an acute angle. The FIG. 1B embodiment is an example of a "traverse wound roll." In the embodiment shown in FIG. 1C the tape 10 is would upon itself so that each successive wind of the tape 10 is aligned parallel to the previous, or underlying, tape 10 wind. The FIG. 1C embodiment is an example of a "pancake wound roll." When the tape is in the form of roll, the pressure sensitive adhesive layer 4 or pressure sensitive composition 26 of a first length of the tape contacts the fiber-encapsulating composition 6 or release coating 24, respectively, of a second length of tape overlaying the first length of the tape.

FIGS. 3A and 3B, and FIGS. 4A and 4B, show embodiments of a one-tape tear opening system. The tape 10 (or tape 20) is adhesively secured to a first surface 41 of a paper board substrate 40. The first surface 7 of the tape 10 defined by the PSA layer 4 contacts the first surface 41 of the paper board substrate 40 so that the tape 10 is adhesively secured to the paper board substrate 40. Alternatively, the first surface 27 of tape 20 defined by the PSA composition 26 contacts the first surface 41 of the paper board substrate 40 so that the tape 20 is adhesively secured to the paper board substrate 40. The paper board substrate 40 also includes a second surface 42 opposing the first surface 41. A tear tab 43 is formed in the paper board substrate 40. In certain embodiments the tear tab 43 has a flared handle portion 44 at its tear-initiating end 45 that enables a user to grip and pull the tear tab 43. The tear-initiating end 45 of the tear tab 43 may be located at an edge of the paper board substrate.

In certain embodiments the tear tab 43 may be made by cutting a profile or pattern that extends through the entire thickness of the paper board substrate 40 and that matches the profile or pattern of the tear tab 43. The cut 47 for the tear tab 43 is made during the converting of the paper board substrate into a container so that the cut 47 and associated tear tab 43 are present in the finished container made from the paper board substrate. In the embodiment shown in FIGS. 3A and 3B, the cut 47 does not cut into the tape 10. In the embodiment shown in FIGS. 4A and 4B the cut 47 also extends into a portion of the tape 10.

Figures 4A, 4B:
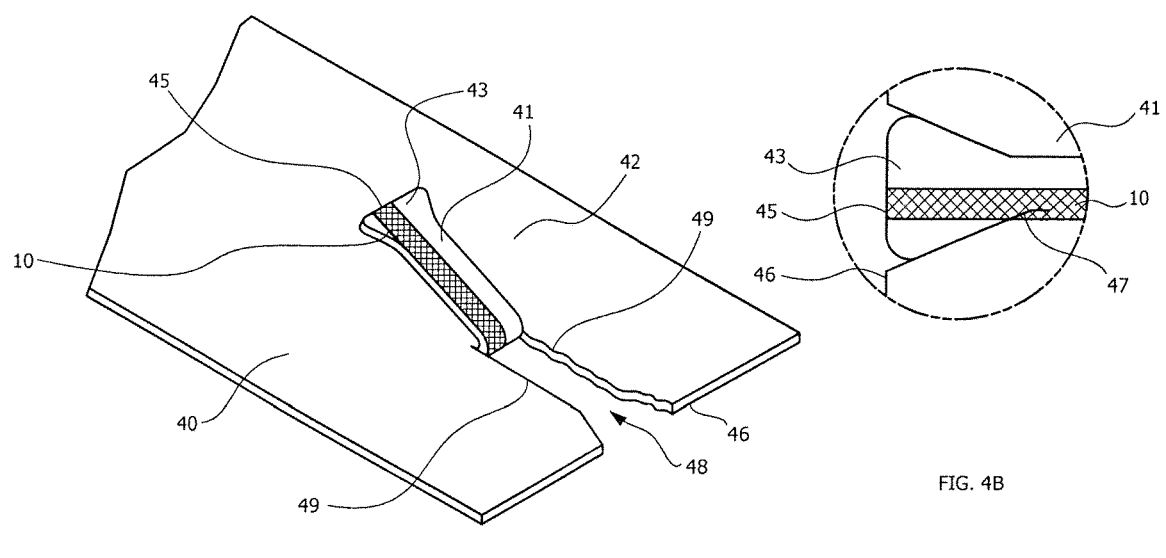
FIG. 4A is a perspective view of another embodiment of a paper board substrate that is partially torn via a tear tape opening system as disclosed herein.
FIG. 4B is an exploded view of a portion of the paper board substrate shown in FIG. 4A.

The paper board substrate 40 with the tear tape 10 (or tear tape 20) may be formed into a container. The first surface 41 of the paper board substrate 40 that carries the tape 10 forms the interior surface of the container, and the opposing second surface 42 of the paper board substrate 40 forms the exterior surface of the container. Because of the cut 47 extending through the entire thickness of the paper board substrate 40, a user can grip the tear tab 43 and pull on the tear tab 43 to open the container along desired tear lines 49. For example, FIGS. 3A and 4A show a tear opening 48 forming in the paper board substrate 40. The tear opening 48 can be extended a desired distance to open the container. For example, the tear tape 10 may be horizontally disposed around the peripheral circumference of a container thereby dividing the container into an upper section and a lower section.

Figure 5:
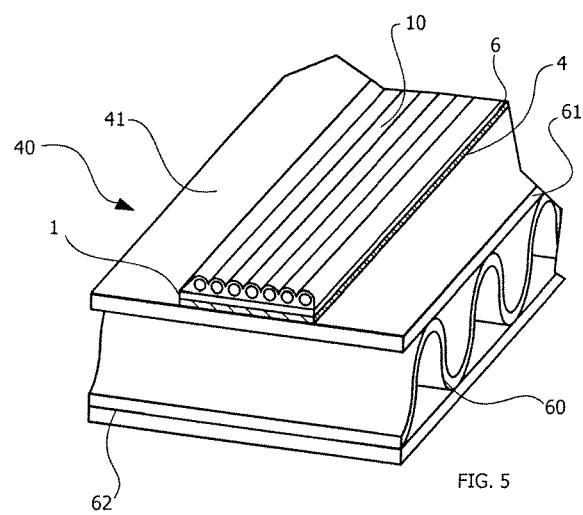
FIG. 5 is a perspective view of a cross section of a paper board substrate and a PSA tape as disclosed herein.

FIG. 5 shows an embodiment in which tape 10 is disposed on the first surface 41 of a paper board substrate 40. PSA layer 4 of tape 10 is adhesively secured to the first surface 41 of the paper board substrate 40. In this embodiment the paper board substrate is a corrugated board substrate that includes a fluted or corrugated inner medium 60 disposed between inner liner 61 and outer liner 62.

Figure 6:
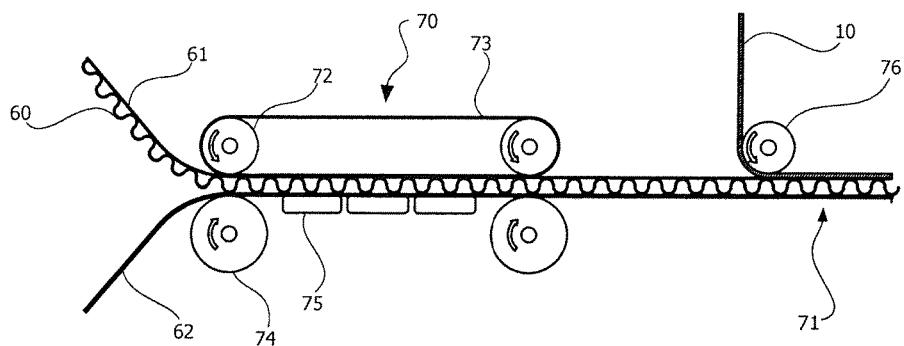
FIG. 6 is a side view of a process for making the paper board substrate/PSA tape embodiment of FIG. 5.

A continuous corrugated board substrate that includes tape 10 may be made, for example, by the process shown in FIG. 6. FIG. 6 shows a corrugator having a wet end segment 70 and a dry end segment 71. Inside liner 61 adhered to the flutes of one side of the corrugated medium 60 is fed between pressure rolls 72 driving a pressure belt 73. An outside liner 62 is applied to the opposing flutes of corrugated medium 60 by being fed into the nip of roller 74. Thus, outside liner 62, corrugated medium 60, and inside liner 61 are sandwiched between pressure belt 73 and hot plates 75. Upstream from the rollers 72 and 74, an adhesive is applied to the flutes of the corrugated medium 60, which is heat activated so that when the three elements pass between pressure belt 73 and hot plates 75, the outside liner is firmly adhered to the corrugated member 60.

In the dry end segment 71 of the corrugator, tape 10 is applied to the outside surface of the inner liner 61. In the embodiment shown in FIG. 6, pressure is applied via a roller 76 so that the PSA surface of the tape 10 adheres to the outside surface of the inner liner 61. When paper board substrate 40 is formed into a container, the outside surface of the inner liner 61 becomes the interior surface of the container. Thus, tear tape 10 lies on the interior surface of the container.

The PSA tape disclosed herein also may be applied to a paper board substrate in a non-continuous manner. For example, the PSA tape may be applied intermittently at predetermined locations to the paper board substrate. In other words, a predetermined length of the PSA tape is applied at each location with a predetermined gap between the lengths of the PSA tape.

Figure 7:
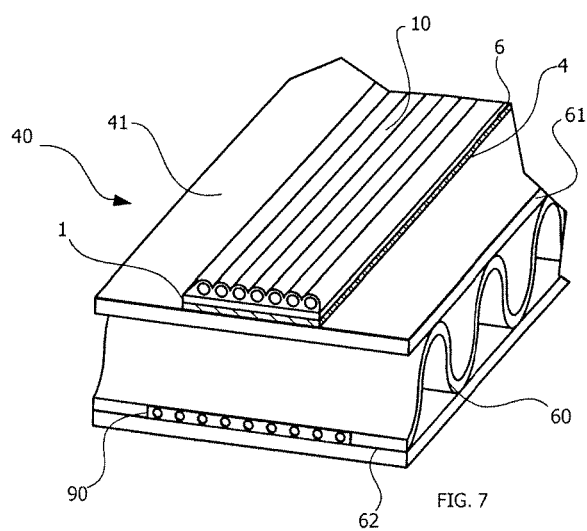
FIG. 7 is a perspective view of a cross section of one embodiment of a paper board substrate and a two tape opening system as disclosed herein.

FIG. 7 shows an embodiment of a two-tape tear opening system in which one of the tapes is the PSA tape disclosed herein. More specifically, PSA tape 10 is disposed on the first surface 41 of a paper board substrate 40. PSA layer 4 of tape 10 is adhesively secured to the first surface 41 of the paper board substrate 40. In this embodiment the paper board substrate is a corrugated board substrate that includes a fluted or corrugated inner medium 60 disposed between inner liner 61 and outer liner 62. A second tape 90, which is a guide tape, is disposed within the paper board substrate 40. The second tape 90 may be located between the outer liner 62 and the corrugated medium 60, or the second tape 90 may be located between the inner liner 61 and the corrugated medium 60. As described above, the paper board substrate 40 with the tear tape 10 (or tear tape 20) and second tape 90 may be formed into a container. The first surface 41 of the paper board substrate 40 that carries the tape 10 forms the interior surface of the container, and the opposing second surface 42 of the paper board substrate 40 forms the exterior surface of the container.

The second tape 90 may be a heat-activatable tape as described above. For example, second tape 90 may be a hot melt adhesive coated tape or string, which may or may not be reinforced with unidirectional fibers aligned parallel to the length direction of the tape or string. The second tape 90 is aligned parallel to the PSA tape 10 and underlies (i.e., is juxtaposed with) the PSA tape 10. The tapes 10 and 90 can be sized to have the same or different widths. In certain embodiments, the second tape 90 is wider compared to tape 10.

The second tape 90 is a guide tape that has no weft or cross machine direction strength. This lack of weft strength in guide tape 90 together with strength in the machine direction allows tearing of the guide tape along the tear lines while simultaneously maintaining edge reinforcing therealong. Thus, by grasping tear tab 43 formed by tear tab cut 47 and pulling the same in the longitudinal direction of tear tape 10 and guide tape 90, tear tape 10 tears through the material of paper board substrate 40 substantially coincident with tear tape 10 and also tears along guide tape 90 which guides the tear and provides edge reinforcing resulting in substantially even tear lines 49. In certain embodiments, the guide tape 90 may be located on the second surface 42 of the paper board substrate 40 rather than embedded within the paper board substrate. Thus, when the paper board substrate is formed into a container, the guide tape 90 is disposed on the exterior surface of the container.

Figure 8:
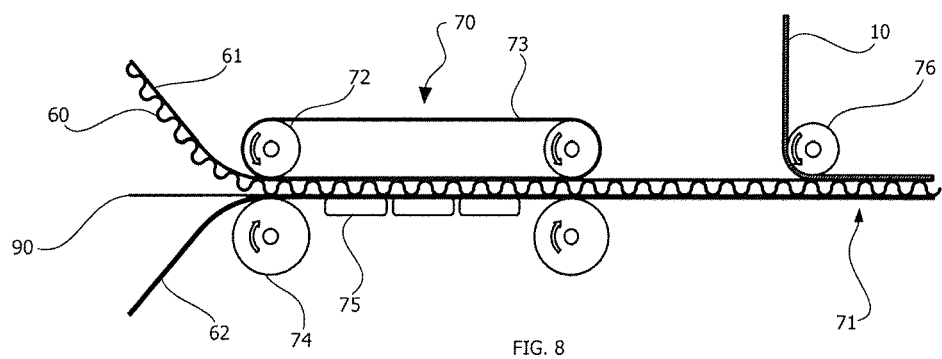
FIG. 8 is a side view of a process for making the paper board substrate/PSA tape embodiment of FIG. 7.

Guide tape 90 is applied to the inside surface of outside liner 62 by feeding it into the nip of the pressure roll 72 and roller 74 between outside liner 26 and corrugated medium 60 (see FIG. 8).

Figure 9:
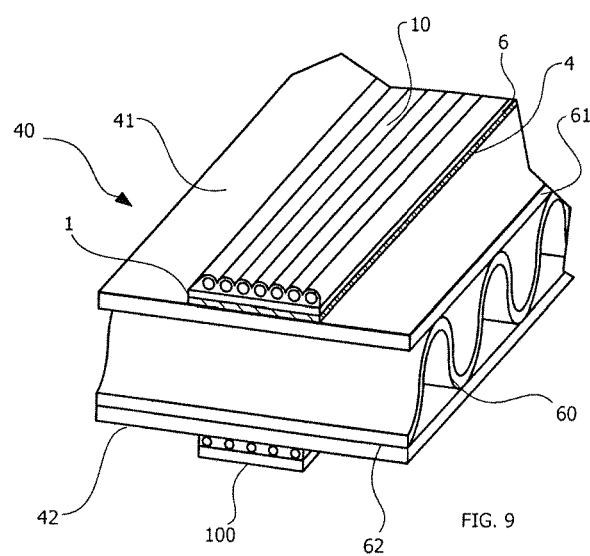
FIG. 9 is a perspective view of a cross section of another embodiment of a paper board substrate and a two tape opening system as disclosed herein.
Figure 10:
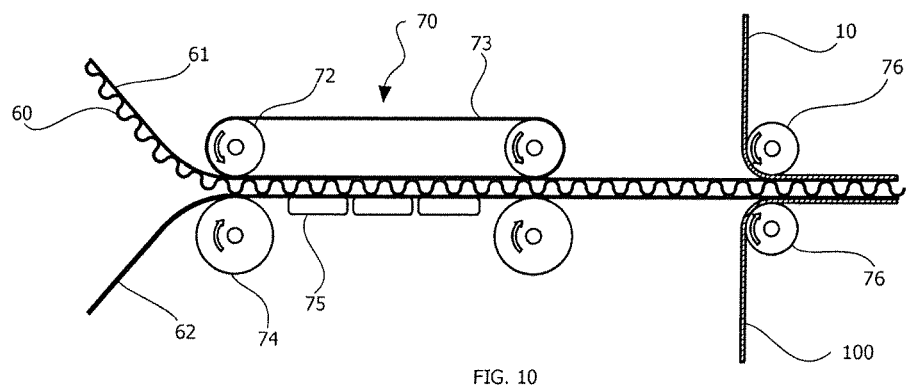
FIG. 10 is a side view of a process for making the paper board substrate/PSA tape embodiment of FIG. 9.

FIG. 9 shows an embodiment of a two-tape tear opening system in which both of the tapes are the PSA tapes disclosed herein. More specifically, a first PSA tape 10 is disposed on the first surface 41 of a paper board substrate 40. PSA layer 4 of tape 10 is adhesively secured to the first surface 41 of the paper board substrate 40. A second PSA tape 20 is disposed on the second surface 42 of the paper board substrate 40. PSA layer 4 of tape 20 is adhesively secured to the second surface 42 of the paper board substrate 40. In this embodiment the paper board substrate is a corrugated board substrate that includes a fluted or corrugated inner medium 60 disposed between inner liner 61 and outer liner 62. The second PSA tape 20 serves as a guide tape as described above in connection with tape 90. FIG. 10 depicts a method of applying both PSA tapes 10, 20 onto the paper board substrate via pressure rollers 76.

Figure 11:
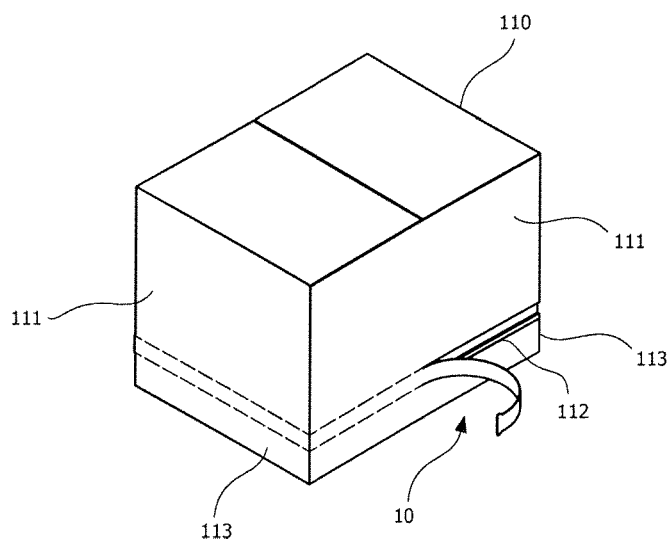
FIG. 11 is a perspective view of a container that includes a PSA tape as disclosed herein.

FIG. 11 shows a container 110 that includes a PSA tear tape 10. Pulling on the PSA tear tape 10 creates a tear opening 112 that divides the container 110 into a top section 111 and a bottom section 113.

It should be recognized that the illustrated embodiments are only preferred examples of the invention and should not be taken as limiting the scope of the invention.

What is claimed is:

1. A tape comprising:
   a cellulosic substrate defining a first surface and an opposing second surface;
   a pressure sensitive adhesive disposed on the first surface of the cellulosic substrate; and
   an encapsulated fibrous material disposed on the second surface of the cellulosic substrate, wherein an encapsulating composition encapsulates the fibrous material and the encapsulating composition comprises a hot melt adhesive composition that includes a release agent and at least one tackifier.

2. The tape of claim 1, wherein the hot melt adhesive composition comprises an ethylene vinyl acetate polymer and the release agent comprises ethyl acrylate-acrylonitrile copolymer, acrylic acid-alkyl acrylate copolymer, polyvinyl chloride resin, polyvinyl N-octadecyl carbamate, polyethylene based wax, polyamide based wax, polysiloxane, fluorocarbon polymer, polyvinyl ester, polyethylene imine, alkyl substituted amine, fatty acid material, a chromium complex, or a mixture thereof.

3. The tape of claim 2, wherein the release agent comprises a fatty acid material.

4. The tape of claim 3, wherein the cellulosic substrate comprises a paper material, the tape has a weft strength of at least 0.5 kg, and a tensile strength of at least 2.3 kg/mm width of tape.

5. A tear opening system for a paper board construct, comprising:
   (a) a paper board substrate defining a first surface and a second surface;
   (b) at least one tear tape of claim 1 disposed on at least one of the first surface or the second surface of the paper board substrate,
   wherein the pressure sensitive adhesive of the tear tape adheres to the first surface or the second surface of the paper board substrate; and
   (c) a tear-initiating element associated with the tear tape and the paper board substrate.

6. The tear opening system of claim 5, wherein the tear tape is disposed on only the first surface of the paper board substrate.

7. The tear opening system of claim 5, wherein the tear tape is disposed on only the first surface of the paper board substrate, and the system further comprises (i) a guide tape embedded within the paper board substrate between the first surface of the paper board substrate and the second surface of the paper board substrate or (ii) a guide tape disposed on the second surface of the paper board substrate.

8. The tear opening system of claim 5, wherein the tear-initiating element comprises a tear tab formed in the paper board substrate at a location coincident with a location of the tear tape.

9. The tear opening system of claim 8, wherein the tear tab is defined by a cut extending through the paper board substrate.

10. The tear opening system of claim 8, wherein the tear tab is defined by a cut extending through the paper board substrate and a portion of the tear tape.

11. The tear opening system of claim 5, wherein the paper board substrate comprises a corrugated board substrate.

12. The tear opening system of claim 5, wherein the fibrous material is disposed on the second surface of the cellulosic substrate, and the tape further comprises an encapsulating composition encapsulating the fibrous material and adhering the fibrous material to the second surface of the cellulosic substrate.

13. A container comprising:
   at least one side wall panel comprising a corrugated board substrate, wherein the side wall panel defines an exterior surface and an interior surface; and
   a tear opening system, wherein the tear opening system comprises:
   (i) a tear tape of claim 1 adhesively secured to the interior surface of the side wall panel
   and (ii) a tear-initiating element located on the tear tape.

14. The tape of claim 1, wherein the hot melt adhesive composition comprises an ethylene vinyl acetate polymer, and the release agent is a surface-migratory release agent with a melt point of at least 120° C.

15. The tape of claim 14, wherein the hot melt adhesive composition comprises 10 to 60 weight percent ethylene vinyl acetate copolymer; 10 to 40 weight percent of at least one tackifier; 5 to 30 weight percent wax; and 5 to 30 weight percent of surface-migratory release agent, based on the total weight of the adhesive composition.

16. The tape of claim 1, wherein the cellulosic substrate comprises a paper material.

17. The tape of claim 1, wherein the fiber of the fibrous material comprises polyester fiber, polyamide fiber, polypropylene fiber, fiberglass, or a combination thereof.

18. The tape of claim 1, wherein the tape has a weft strength of at least 0.5 kg, and a tensile strength of at least 2.3 kg/mm width of tape.

19. The tape of claim 1, wherein the hot melt adhesive composition comprises an ethylene vinyl acetate polymer and the release agent comprises ethyl acrylate-acrylonitrile copolymer, acrylic acid-alkyl acrylate copolymer, polyvinyl chloride resin, polyvinyl N-octadecyl carbamate, polyethylene based wax, polyimide based wax, fluorocarbon polymer, polyvinyl ester, polyethylene imine, alkyl substituted amine, fatty acid material, a chromium complex, or a mixture thereof.

20. The tape of claim 1, wherein the at least one tackifier is selected from a coumarone-indene resin, a terpene resin, a rosin, or a mixture thereof.

21. The tape of claim 1, wherein the tackifier is present in an amount of at least 5 weight % based on the total weight of the hot melt adhesive composition.

* * * * *